United States Patent [19]

Bittmann

[11] Patent Number: 5,046,663
[45] Date of Patent: Sep. 10, 1991

[54] HEATER

[75] Inventor: Michael Bittmann, Munich, Fed. Rep. of Germany

[73] Assignee: Webasto AG Fahrzeugtechnik, Fed. Rep. of Germany

[21] Appl. No.: 436,799

[22] Filed: Nov. 15, 1989

[30] Foreign Application Priority Data

Nov. 21, 1988 [DE] Fed. Rep. of Germany ....... 3839242

[51] Int. Cl.$^5$ ............................................. B60H 1/02
[52] U.S. Cl. .......................... 237/12.3 C; 126/110 B; 181/238
[58] Field of Search ...................... 237/12.3 C, 12.3 R; 181/238, 53, 224; 126/110 B, 110 C, 110 D

[56] References Cited

U.S. PATENT DOCUMENTS 4,520,769 6/1985 Kratzer ...................... 237/12.3 C X Primary Examiner—Henry A. Bennett
Attorney, Agent, or Firm—Sixbey, Friedman, Leedom & Ferguson

[57] ABSTRACT

A heater, in particular a motor vehicle heater, has a muffler insert in the exhaust gas outlet, a muffler insert that reduces, in particular, disturbing, low-frequency combustion noises. With the aid of the muffler insert, the exhaust gas stream in the area of the exhaust gas outlet of the heater is divided into at least two partial streams. The muffler insert can be made as a sheet metal part having hollow bodies that are made of pipe pieces. Alternatively, the muffler insert can be made as a one-piece cast part.

11 Claims, 2 Drawing Sheets

HEATER

BACKGROUND OF THE INVENTION

The invention relates to a heater, in particular a motor vehicle heater, with a burner placed in a combustion chamber, a heat exchanger surrounding the burner, and an exhaust gas outlet by which the hot combustion gases generated in the combustion chamber are exhausted from the heater after passing through the heat exchanger.

In heaters of the type mentioned above, noises due to the combustion in the combustion chamber, in particular low-frequency combustion noises, are produced that are perceived as disturbing, especially when such a heater is installed in a motor vehicle. Furthermore, such low-frequency combustion noises are quite audible and over long distances, intensify the environmental noise pollution. Since motor vehicle manufacturers, now, place an ever-increasing value on achieving a motor vehicle interior that is as quiet as possible, for this reason, there also exists a need, in particular, for a motor vehicle heater that operates with little noise.

SUMMARY OF THE INVENTION

Thus, the primary object of the present invention is to provide a heater, in particular a motor vehicle heater, of the generic type mentioned above, in which, in a structurally simple way, a reliable noise muffling is achieved, in particular with respect to the low-frequency combustion noises, to reduce the audible combustion noises, while overcoming the difficulties described above.

According to a preferred embodiment of the invention, this object is achieved by a heater, in particular a motor vehicle heater with a burner placed in a combustion chamber, a heat exchanger surrounding the burner and an exhaust gas outlet by which the hot combustion gases generated in the combustion chamber are exhausted from the heater after passing through the heat exchanger, in which a muffler insert is provided in the area of the exhaust gas outlet and that divides the exhaust gas stream into at least two partial streams.

In such a heater according to the invention, the exhaust gases that carry the combustion noises produced during combustion are, thus, divided into at least two partial streams by the muffler insert. In this way, it has, surprisingly, been discovered that a sound level reduction of at least about 3-4 dBA is achieved, and in particular, the disturbing, low-frequency combustion noises are muffled. Thus, in the heater according to the invention, the combustion noises are considerably less perceivable and a heater operating with little noise is achieved. Since, further, in the heater according to the invention, a muffler insert is used that is placed in the area of the exhaust gas outlet, the overall design of the heater can otherwise remain essentially unchanged. In contrast to additional muffling devices in the area of the exhaust gas pipe that branches off the exhaust gas outlet of the heater, the muffler insert of the heater according to the invention is designed in a structurally uncomplicated way and it can be inserted, advantageously, directly into the exhaust gas connecting piece which forms the exhaust gas outlet of the heater, from the inside, so that it is also mountable in a simple way.

Preferably, the muffler insert comprises at least two hollow bodies with approximately parallel axes and through which the partial streams of the exhaust gas flow. With the aid of these hollow bodies of the muffler insert, the exhaust gas stream is divided into partial streams in the area of the exhaust gas outlet of the heater, and these two hollow bodies of the muffler insert are placed so that they occupy as little space as possible to achieve a compact structure. Further, the flow resistance generated by the muffler insert is kept so minimal that no adverse effects on the progress of combustion process in the combustion chamber are produced.

In an advantageous embodiment according to the invention, the hollow bodies are made as pipe pieces, so they can be provided adjacent to one another on the muffler insert. Depending on the selection of material, it can also prove suitable to give the hollow bodies a noncircular cross section, so that the hollow bodies have, for example, a kidney or slit-shaped cross section. In this way, the muffling effect can be optimized with respect to the shape of the hollow bodies as a function of the frequency range.

Preferably, the muffler insert, according to the invention, is so placed in the exhaust gas outlet of the heater that the entire exhaust gas stream flows, while being divided, directly through the hollow bodies. In this way, an effective muffling effect is produced since, in fact, the muffler insert intercepts the entire exhaust gas stream and no portion of the exhaust stream can bypass the muffler insert in the exhaust gas outlet of the heater.

Also, advantageously, the hollow bodies are connected to one another, by a common connecting flange, so that the muffler insert is a component that can be handled as a unit, and can be inserted into the exhaust outlet during assembly of the heater, in a simple way. The cross-sectional dimensions of the connecting flange are matched to the corresponding cross-sectional dimensions of the exhaust gas outlet of the heater, and the connecting flange forms a tight seal with the exhaust gas outlet of the heater, for which purpose, optionally, additional sealing devices can be provided.

The muffler insert can be made as a sheet metal part, and the hollow bodies can suitably be made of pipe pieces, with the connecting flange being made as a perforated plate, and the pipe pieces are fastened by welding, for example. Alternatively, the muffler insert can be made as a cast part, which enables noncircular cross-sectional shapes to be selected and made to optimize the muffling effect of the muffler insert.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
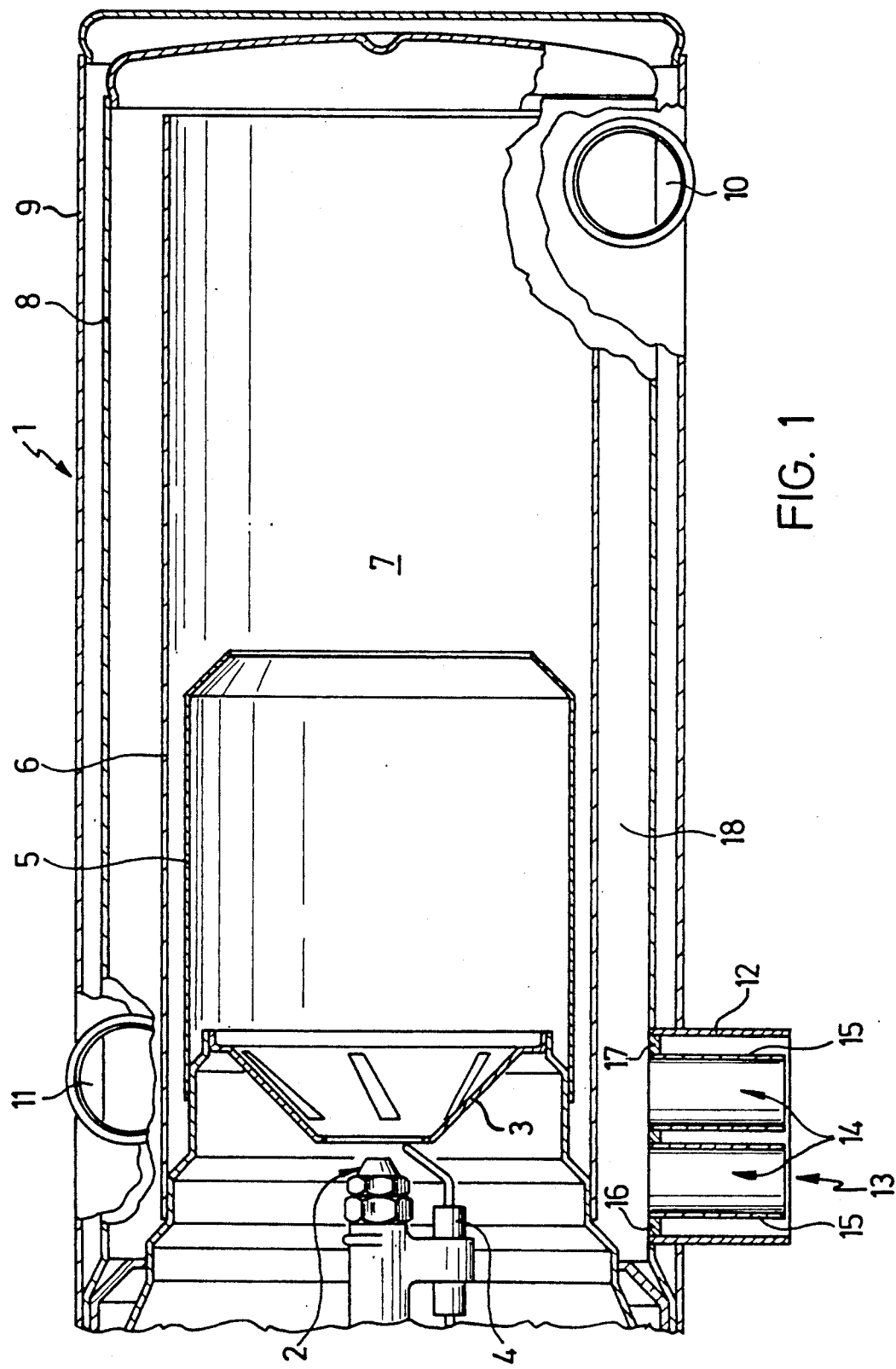
FIG. 1 is a diagrammatic partial sectional view of a heater with a muffler insert in its exhaust gas outlet.

FIG. 1 shows, as an example of a heater according to the invention, a motor vehicle heater designated overall by the reference numeral 1. Here, a so-called "water heater" is involved, i.e., a motor vehicle heater through which a liquid heat exchange medium flows. Such a motor vehicle heater can be incorporated, for example, into the coolant circuit of an internal combustion engine of a motor vehicle. Naturally, the invention is not limited to the embodiment of heater 1 as shown, and it is also applicable to other heater designs in which, for example, a gaseous heat carrier, such as air, is used.

The heater shown in FIG. 1 has an atomizing burner which has a fuel jet for fuel preparation. A swirl body 3 is placed axially at a distance from fuel jet 2. Ignition of the prepared fuel/air mixture takes place with the aid of an ignition device 4 which, in the example represented, is a high-voltage ignition with an igniter. A burner insert 5 partially projects into a combustion chamber 7 that is formed by a combustion pipe 6, and is connected to swirl body 3 in the manner shown. Combustion pipe 6 is surrounded by a heat transfer exchanger 8, and the latter is, in turn, surrounded by an outer casing 9, which is formed from the housing casing of heater 1.

The liquid heat exchange medium enters heater 1 by an intake 10, flows through the interspace between outer casing 9 and heat exchanger 8 and leaves heater 1 by an outlet 11. The hot combustion gases generated in combustion chamber 7 are deflected by about 180° at the end of the combustion chamber 7, and as they, then, travel through the interspace 18, between the combustion pipe 6 and the heat exchanger 8, they transfer their heat, via heat exchanger 8, to the liquid heat exchange medium. After passage through heat exchanger 8, the combustion gases then escape from the heater 1, as exhaust gas, via an exhaust gas outlet 12, which is made in the form of an exhaust gas outlet connecting piece.

Figure 2:
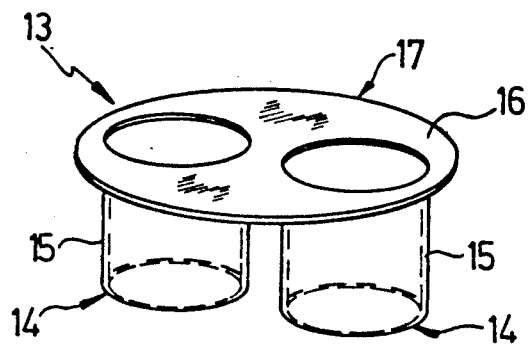
FIG. 2 is a perspective representation of an embodiment of a muffler insert.

A muffler insert, designated 13 as a whole, is placed in exhaust gas outlet 12. In combination with FIG. 2, it can be seen that this muffler insert 13 is a sheet metal part comprised of two adjacent hollow bodies 14 that are formed, in this embodiment, by sheet metal pipe pieces 15 that have approximately parallel axes. These pipe pieces 15 are fastened to a perforated plate 16, for example, by welding.

As shown in FIG. 1, this muffler insert 13 is inserted into exhaust gas outlet 12, so that perforated plate 16, acting as a connecting flange 17, lies tightly against the inner wall of exhaust gas outlet 12, and can be fastened to the latter by welding, for example. This muffler insert 13 divides the combustion gas stream (exhaust gas stream), passing through interspace chamber 18 of heater 1, into two partial streams that are divided between the two hollow bodies 14 formed by pipe pieces 15. Muffler insert 13, thereby, causes a muffling, in particular, of the low-frequency combustion noises, so that heater 1 can operate quietly in the operating state.

The size and number of hollow bodies 14 of muffler insert 13 is selected, here, so that the combustion process within combustion chamber 7 of heater 1 is essentially unimpaired, i.e., muffler insert 13 is designed so that it produces a negligible flow resistance in exhaust gas outlet 12. Furthermore, muffler insert 13 is placed in exhaust gas outlet 12 so that the entire exhaust gas stream is divided between the two hollow bodies 14, i.e., it must be avoided so that exhaust gases can pass between exhaust gas outlet 12 and connecting flange 17, since, otherwise, additional flow noises could occur.

Figure 3:
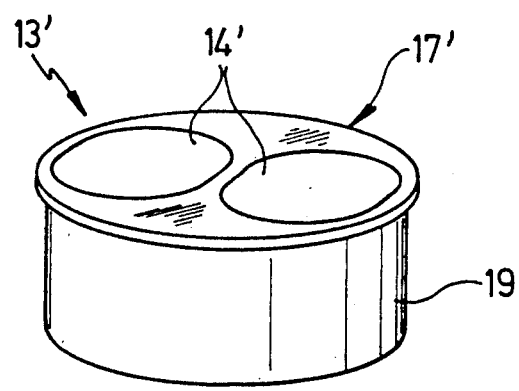
FIG. 3 is a perspective view of a modified embodiment of a muffler insert.

FIG. 3 shows a modified embodiment of a muffler insert that is designated, overall, by reference numeral 13'. This muffler insert 13' is formed as a one-piece cast part 19, so that its hollow bodies 14' are integral with its connecting flange 17'. Hollow bodies 14' have a noncircular cross section which, for example, as shown here, is of an oval shape.

The operation of this muffler insert 13' coincides essentially with that explained above. The noncircular cross-sectional shape of hollow bodies 14' optimizes the muffling effect of muffler insert 13'. Since muffler insert 13' is made as a cast part 19, it represents a single component that can be easily handled in this form and inserted tightly into exhaust gas outlet 12 without further work steps.

Although such an example has not been shown, muffler insert 13, 13' can also have more than two hollow bodies 14, 14'. However, the number of hollow bodies 14, 14' used depends on the cross-sectional area of exhaust gas outlet 12. If too large a number of hollow bodies 14, 14' is selected, muffler insert 13, 13' offers too great a flow resistance, so that an impairment of the combustion process in combustion chamber 7 may result. The minimum allowable cross-sectional area of the individual hollow bodies 14, 14' can be determined by tests, in which the effects on the combustion process in combustion chamber 7 are considered. Thus, the number of hollow bodies 14, 14' is selected so that the sum of their cross-sectional areas is larger than the minimum allowable cross-sectional area at which the combustion process in combustion chamber 7 will be essentially unaffected.

The shape of hollow bodies 14, 14' can also be selected to be different from the examples represented. Thus, the cross-sectional shape of hollow bodies 14, 14' can be, for example, kidney-shaped, or combinations of circular sections, elliptical sections and other connecting curves are possible. The cross-sectional shape of hollow bodies 14, 14' can, optionally, be matched to the respective circumstances of the different designs of heater 1, so that the muffling effect of muffler insert 13, 13' can be optimized.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A motor vehicle heater of the type comprising a burner placed in a combustion chamber, a heater exchanger surrounding the burner, and an exhaust gas outlet by which a flow of hot combustion gases generated in the combustion chamber are released from the heater after passing through the heat exchanger; wherein a muffler insert is incorporated into the heater within the flow of the gases in an area of the exhaust gas outlet, said muffler comprising means for dividing the flow of gases into at least two partial streams before leaving said exhaust gas outlet.

2. Heater according to claim 1, wherein the muffler insert has at least two hollow bodies through which the partial streams of gases flow, said hollow bodies having approximately parallel axes.

3. Heater according to claim 2, wherein the muffler insert is placed in the exhaust gas outlet of the heater in a manner causing the entire flow of gases to pass directly through the hollow bodies while being divided.

4. Heater according to claim 3, wherein the hollow bodies are formed by pipe pieces.

5. Heater according to claim 3, wherein the hollow bodies have a noncircular cross section.

6. Heater according to claim 5, wherein the muffler insert is formed of a one-piece cast metal part.

7. Heater according to claim 1, wherein the muffler insert is placed in the exhaust gas outlet of the heater in a manner causing the entire flow of gases to pass directly through it while being divided.

8. Heater according to claim 7, wherein the muffler is formed of hollow bodies which are connected to one another at one end by a common connecting flange.

9. Heater according to claim 8, wherein the connecting flange is seated tightly within the exhaust gas outlet.

10. Heater according to claim 9, wherein the muffler insert is a sheet metal part.

11. Heater according to claim 9, wherein the muffler insert is a cast metal part.

* * * * *